June 14, 1927.

C. R. RANEY 1,632,148

GRAIN SHOCKER

Filed Oct. 5, 1922   2 Sheets-Sheet 1

Inventor.
Clemma R. Raney,
By H. P. Doolittle,
Atty.

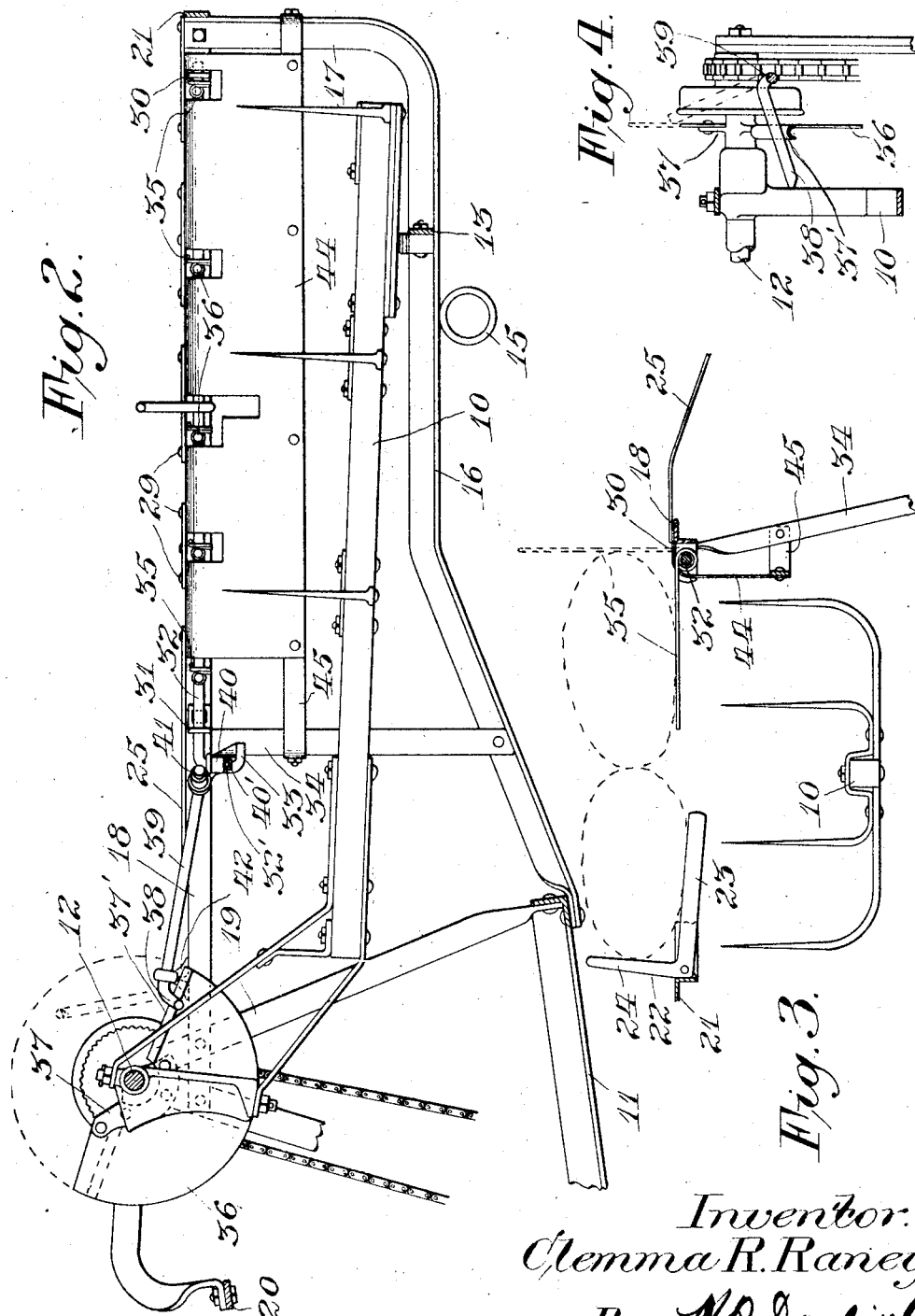

Patented June 14, 1927.

1,632,148

UNITED STATES PATENT OFFICE.

CLEMMA R. RANEY, OF CHICAGO, ILLINOIS, ASSIGNOR TO INTERNATIONAL HARVESTER COMPANY, OF CHICAGO, ILLINOIS, A CORPORATION OF NEW JERSEY.

GRAIN SHOCKER.

Application filed October 5, 1922. Serial No. 592,475.

This invention relates to shocking machines and has for its object properly to convey sheaves or unbound grain from the binding mechanism of a harvester to a sheaf delivery member which in turn delivers the sheaves into the receptacle of the shocker.

A further object is to prevent loose grain from obstructing the return of the sheaf delivery member to its normal sheaf receiving condition.

A still further object is to provide means for supporting discharged sheaves in the path of the sheaf delivery member.

These and other objects are attained by providing means co-operating with the sheaf delivery member whereby sheaves are supported in the path of the sheaf delivery member and whereby any loose grain is held out of the path of movement of the sheaf delivery member and at the same time said means is also employed to retard the discharge of any sheaves from the binding mechanism of the harvester during the time the sheaf delivery member is delivering sheaves into the receptacle of the shocker. In order to disclose my invention I have illustrated one embodiment of the same in the accompanying drawings. It is to be understood, however, that the embodiment shown herein, for the purpose of illustration, may be modified without departing from the spirit and scope of my invention.

In these drawings—

Fig. 2 is a side elevational view of the structure shown in Fig. 1;

Fig. 3 is a cross sectional view taken on the line 3—3 in Fig. 1; and

Fig. 4 is a detail view of the sheaf-delivery member shaft.

Figure 1:
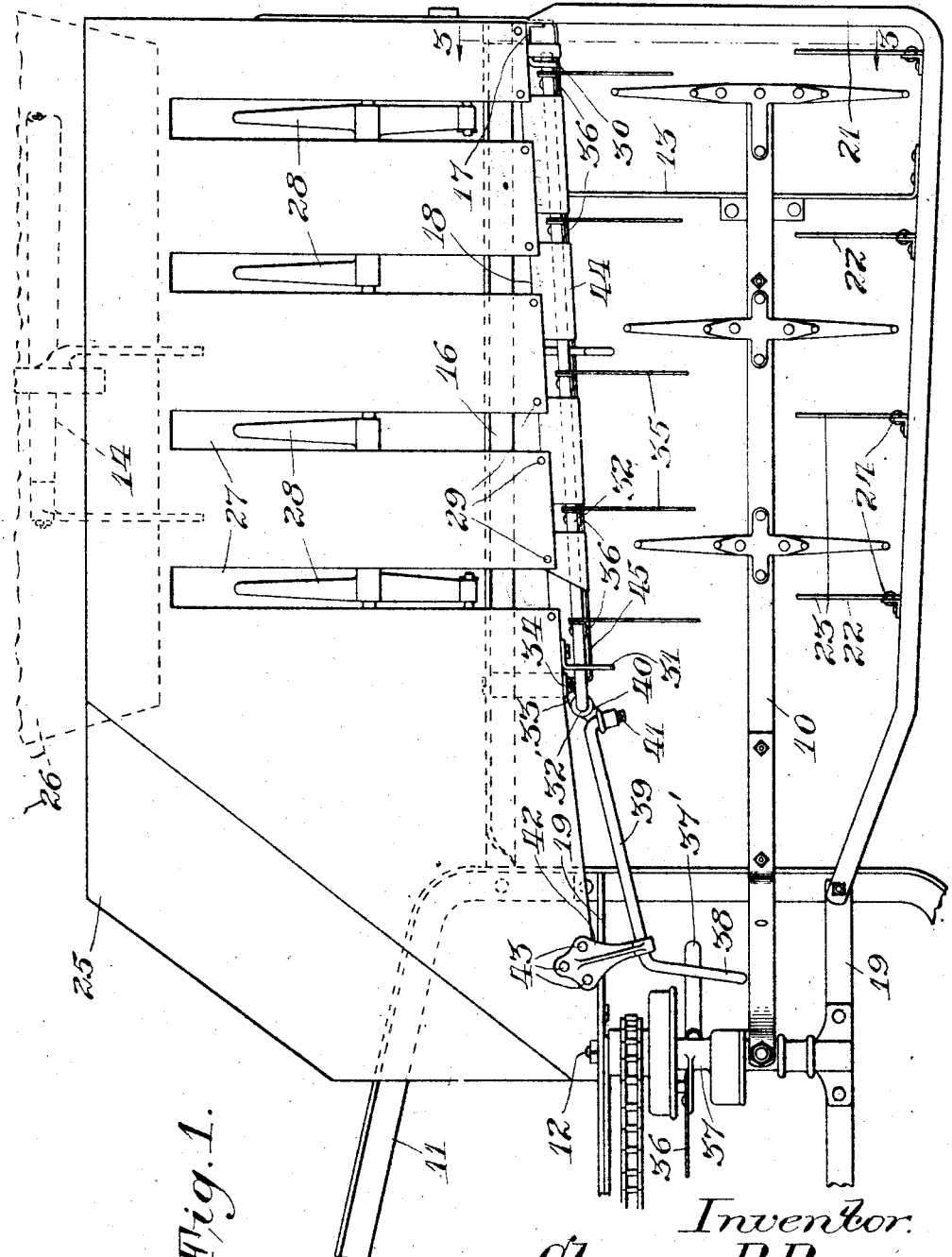
Fig. 1 is a top plan view of that portion of a shocker showing my invention embodied therein.

That part of the shocker shown is of the general type described and claimed in my U. S. Letters Patent No. 1,231,195, June 26, 1917, and No. 1,293,922, February 11, 1919, a rearwardly swinging sheaf delivery member or fork 10, being used, which is carried by a shocker frame 11 and movable by means of a resilient pitman connection (not shown) about the axis of a shaft 12 from its sheaf receiving position, as shown in Fig. 2, wherein it rests upon a support 13 at a point beneath the deck of the binder, to its sheaf delivering position, wherein it delivers the sheaves in a prostrate position in a shock receptacle (not shown) carried at the rear end of the shocker frame 11.

The shocker proper is attached to the grain binder 14 (only part of which is shown) by means of a pipe 15 extending stubblewardly from the harvester. Secured to and supported by the pipe 15 is a forwardly extending tongue 16 fastened to the main frame of the shocker 11. The forward end of the tongue 16 is provided with an upwardly extending portion 17, to which is secured a deck angle 18 which extends rearwardly and is connected at its rear end to the fork shaft supporting members 19, which in turn are secured to the main frame 11 and cross frame 20. Extending outwardly at the stubbleward side of the sheaf delivery member 10 is an L-shaped angle member 21 secured at one end to the vertically extending portion 17 of the tongue 16 and secured at its rearward end to the stubbleward fork shaft support member 19. Secured to the angle 21 on the inner side thereof are stationary bundle supporting members 22. These bundle supporting members are spaced apart and are provided with substantially horizontal and vertical portions 23 and 24 respectively. The shocker is provided with a deck extension 25 which is secured to the binder deck 26 of the harvester by any well known means. The deck 25 is provided with transversely disposed slots 27 which are adapted to permit the supplemental discharge arms 28 to swing upwardly therethrough for discharging the sheaves on to the sheaf delivery member after they have been discharged from the binding mechanism 14 of the binder.

The above described mechanism forms no part of the present invention. It is therefore thought a more detailed description of the same is unnecessary.

The stubbleward end of the deck extension 25 is secured to the deck angle 18 by means of bolts 29. Secured to the angle 18 at its forward and rearward ends are bearing brackets 30 and 31 respectively. Pivotally mounted on the bearing brackets 30 and 31 is a sheaf supporting shaft 32. Secured at intervals on the shaft 32 are sheaf supporting springs 35, secured to said shaft by means of bolts 36. These sheaf supports or springs 35 are normally held in a horizontal position, or in the position shown in the full lines in Figures 1 and 3 by a stop portion 33 engaging the vertically disposed brace 34 connected to the tongue 16 at one end and to the deck angle 18 at the other. These springs 35 are adapted to be swung from this position to the position shown in dotted lines in Fig. 3. The stop 33 is formed as an integral part of a universal connection 40 which has one end thereof pivotally secured to a downwardly projecting portion 32' of the shaft 32 by means of a cotter 40'. The sheaf supporting members or springs 35 are actuated or controlled by the sheaf delivery member 10 through the mechanism which comprises a substantially semi-circular cam member 36 secured to the bracket 37 which also forms the bracket for the sheaf delivery member 10. The cam member 36 is provided with a curve or roll in portion 37' which is adapted to engage a crank arm 38 formed on the connecting link 39 which is connected to the sheaf supporting shaft 32 by the universal connection 40. The forward end of the connection 39 is held pivotally secured to the universal joint 40 by means of a cotter 41. The rearward end of the connecting link 39 is supported in a bearing bracket 42 which is secured to the deck extension 25 by means of bolts 43. Secured at one end to the deck angle 18 and covering the sheaf supporting shaft 32 is a shield member 44 which extends downwardly and is secured to a longitudinal bar 45 which in turn is secured to the vertical brace 34 at its rearward end and secured to the vertical portion 17 of the tongue 16 at its forward end.

In the operation of my improved sheaf supporting and sheaf retarding mechanism two sheaves are discharged by the supplemental discharging arms 28 over the deck extension 25 to the position shown in dotted lines in Fig. 3. When the sheaves have assumed this position the sheaf delivery member 10 is tripped, thus swinging the sheaf delivery member upwardly and rearwardly and carrying with it the cam member 36, which in turn engages the crank 38 of the connecting link 39 and thereby swings the shaft 32 in its bearings 30, 31, swinging the sheaf supporting springs 35 from the full line position shown in Fig. 3 to the dotted line position, in which position the springs 35 prevent or retard the discharge of any sheaves or loose grain which might be discharged by the binding mechanism 14 of the harvester during the time the sheaf delivery member is delivering sheaves into the receptacle of the shocker. It will be seen that by reason of the semi-circular cam 36 the crank 38 will be maintained in the dotted line position shown in Figures 1 and 4, during the time the sheaf delivery member 10 is absent from its normal sheaf receiving position. In other words, the sheaf supporting tines or spring 35 act as a retarder to prevent the discharge of any bundles or loose grain into the path of the sheaf delivery member during the sheaf delivery member's absence and upon the return of the sheaf delivery member to its normal sheaf receiving position the sheaf supporting tines or springs return to their normal bundle-supporting position, or the position shown in full lines in Figures 1 and 3. While in the above specification I have described but one embodiment which my invention may possess, in practice it will be assumed that the same is capable of modification and that modification may be employed without departing from the spirit and scope of my invention as expressed in the following claims.

What I claim as my invention and desire to secure by Letters Patent is:

1. In a grain shocker having a frame, the combination of a sheaf delivery member pivotally carried thereon, means for swinging a sheaf delivery member, and means carried by the frame for both supporting sheaves in the path of movement and holding sheaves out of the path of movement of said sheaf delivery member.

2. In a grain shocker having a frame, the combination of a sheaf delivery member pivotally carried thereon, means for swinging the sheaf delivery member, and movable means mounted on the frame entirely to one side of the path of movement of the delivery member and adapted in one position to hold sheaves out of said path of movement and in another position to hold sheaves in said path of the delivery member.

3. In a grain shocker having a frame, the combination of a sheaf delivery member pivotally carried thereon, means for swinging the sheaf delivery member, and a plurality of arms movable as a unit and mounted on the frame at one side of the path of movement of the delivery member and adapted in one position to hold sheaves out of said path of movement of the delivery member and in another position to hold sheaves in said path of movement of the delivery member.

4. In a grain shocker having a frame, a sheaf delivery member carried thereby, means for moving said delivery member from sheaf receiving to sheaf discharging position, and means for holding sheaves away from the path of the sheaf delivery member during the time it is absent from the sheaf receiving position.

5. In a grain shocker having a frame, a sheaf delivery member carried thereby, means for moving said delivery member from sheaf receiving to sheaf discharging position, and movable means adapted in one position to support sheaves away from the path of movement of said delivery member when it is absent from the sheaf receiving position, the same means in another position adapted to support sheaves in the path of movement of the delivery member when it is in the sheaf receiving position.

6. In a grain shocker, a frame, a sheaf delivery member carried thereby, means for moving said delivery member from sheaf receiving to sheaf discharging position, and means controlled by the movement of the delivery member for holding sheaves away from the path of the delivery member when it is absent from its sheaf receiving position.

7. In a grain shocker, a frame, a sheaf delivery member carried thereby, means for moving said delivery member from sheaf receiving to sheaf discharging position, and means controlled by the movement of the delivery member for holding sheaves in the path of movement of the delivery member when it is in its sheaf receiving position.

8. In a grain shocker, a frame, a sheaf delivery member carried thereby, means for moving the sheaf delivery member from sheaf receiving to sheaf discharging position, and movable means controlled by the movement of the delivery member adapted in one position to support sheaves away from the path of movement of said delivery member when it is absent from the sheaf receiving position, the same means in another position adapted to support sheaves in the path of movement of the delivery member when it is in the sheaf receiving position.

9. In a grain shocker, a frame, a sheaf delivery member pivoted thereon, means for moving the delivery member from sheaf receiving to sheaf discharging position, cam means connected to and movable with the sheaf delivery member, and means operable by said cam means for holding sheaves out of the path of movement of the delivery member when it is absent from the sheaf receiving position.

10. In a grain shocker, a frame, a sheaf delivery member pivoted thereon, means for moving the delivery member from sheaf receiving to sheaf discharging position, cam means connected to and movable with the sheaf delivery member, and means operable by said cam means for supporting sheaves in the path of movement of the delivery member when it is in the sheaf receiving position.

11. In a grain shocker, a frame, a sheaf delivery member pivoted thereon, means for moving said delivery member from sheaf receiving to sheaf discharging position, cam means connected to and movable with the sheaf delivery member, and movable means controlled by said cam means adapted in one position to support sheaves away from the path of movement of said delivery member when it is absent from the sheaf receiving position, the same means in another position adapted to support sheaves in the path of movement of the delivery member when it is in the sheaf receiving position.

12. In a grain shocker adapted to travel alongside a grain binder, a frame, a sheaf delivery member pivoted thereto, means for moving said delivery member and means pivoted to the frame and normally positioned in the path of movement of said delivery member for supporting sheaves received from the grain binder in such position.

13. In a grain shocker adapted to travel alongside a grain binder, a frame, a sheaf delivery member adapted to receive sheaves from the grain binder and pivoted to the frame, means for moving said delivery member and means movable from the path of movement of the sheaf delivery member into the path of movement of the sheaves discharged from the grain binder for retarding the discharge of said sheaves.

14. In a grain shocker adapted to travel alongside a grain binder, a frame, a sheaf delivery member pivoted thereon and adapted to receive sheaves from the grain binder, means for moving said delivery member and means controlled by the sheaf delivery member and movable from the path of movement of the sheaf delivery member into the path of movement of the sheaves discharged from the grain binder for retarding the discharge of said sheaves.

15. In a shocking machine having a frame, a sheaf delivery member pivoted thereto, a deck for receiving sheaves positioned adjacent said sheaf delivery member, a sheaf supporting member pivoted to said deck, a cam member connected to said sheaf delivery member, and means connecting said sheaf supporting member with said cam for actuating said sheaf supporting member.

16. In a shocking machine having a frame, a sheaf delivery member pivoted thereto, a deck for receiving sheaves positioned adjacent said sheaf delivery member, a plurality of springs pivoted to said deck, a cam member connected to said sheaf delivery member, and means connecting said springs with said cam for actuating said springs.

17. In a shocking machine having a frame, a shaft mounted on said frame, a sheaf delivery member carried on said shaft, a deck for receiving sheaves positioned adjacent said sheaf delivery member, a sheaf supporting member pivoted to said deck, a cam mounted on said shaft, and means connecting said sheaf delivery member with said cam for actuating said sheaf supporting member.

In testimony whereof I affix my signature.

CLEMMA R. RANEY.